United States Patent [19]
Trkla

[11] 3,943,837
[45] Mar. 16, 1976

[54] DUAL PURPOSE BARBECUE GRILL AND ROTISSERIE

[76] Inventor: Theodore Trkla, 624 4th Ave. South, South St. Paul, Minn. 55075

[22] Filed: May 8, 1975

[21] Appl. No.: 575,619

[52] U.S. Cl. .................. 99/339; 99/393; 99/401; 99/421 H; 126/9 B; 126/25 A
[51] Int. Cl.² .......................................... A47J 37/04
[58] Field of Search ............... 126/9 R, 9 B, 25 A; 99/339, 393, 401, 421 H, 450

[56] References Cited
UNITED STATES PATENTS

| | | | |
|---|---|---|---|
| 2,842,044 | 7/1958 | Kirk | 99/339 |
| 3,105,483 | 10/1963 | Bryan | 126/9 |
| 3,208,808 | 9/1965 | Knapp | 99/339 |
| 3,335,712 | 8/1967 | Marasco | 126/25 |
| 3,359,887 | 12/1967 | Cleveland | 99/339 X |

*Primary Examiner*—Billy J. Wilhite
*Attorney, Agent, or Firm*—Langevin and Morse

[57] ABSTRACT

A dual purpose cooking device is provided in which foods may be cooked simultaneously on a barbecue grill and a rotisserie bar. The cooking device is portable, versatile, and efficient. Cooking temperature and speed are varied by adjusting height of fuel tray and barbecue grill.

11 Claims, 3 Drawing Figures

U.S. Patent   March 16, 1976   3,943,837
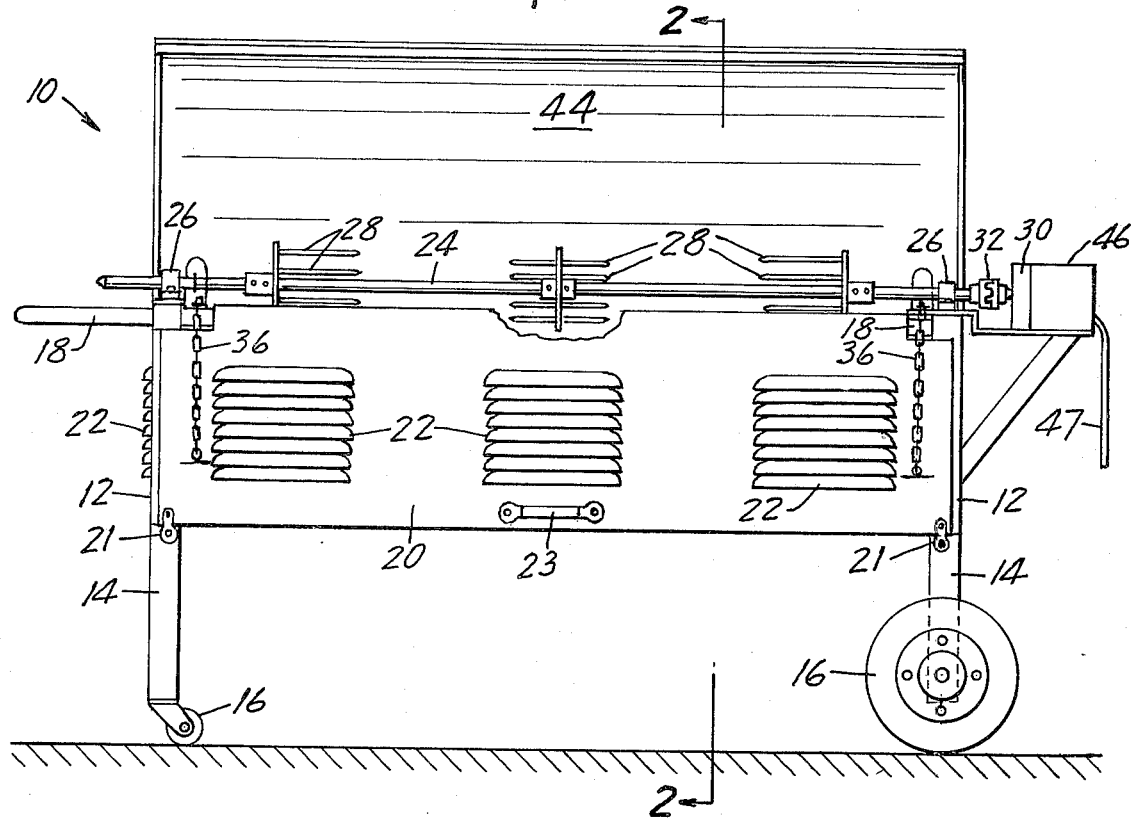
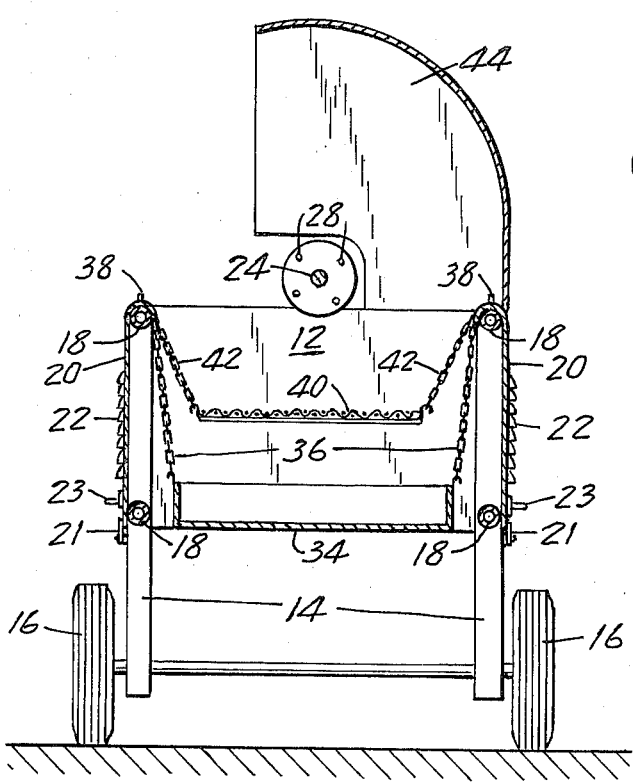
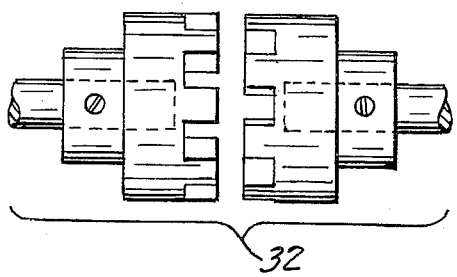

DUAL PURPOSE BARBECUE GRILL AND ROTISSERIE

BACKGROUND OF THE INVENTION

A popular outdoor summer activity has always been barbecuing, whether it be simply a family affair or on a larger scale. A variety of barbecue grills and hibachies are sold each year to at least partially satisfy the demand for cooking devices used in such activities. These known devices are typically comprised of an open grill supported over a charcoal tray. Although such devices satisfy the demand of smaller groups of people such as families, etc., they normally have insufficient cooking capacity for larger groups. Although it is possible to make such devices larger, or to use a number of smaller devices, these devices are generally not very versatile or practical. For example, such devices do not have the capability of cooking very large pieces of meat such as whole pigs, turkeys, chickens, etc.

While large pieces of meat can be cooked in socalled "open-pit" barbecues, this procedure is cumbersome and time-consuming. Consequently, much planning and organization goes into this type of cooking. Furthermore, this type of cooking does not simultaneously allow for conventional barbecuing of smaller pieces of meat such as steaks or hamburgers.

In spite of the great popularity and demand for a variety of barbecued foods there has not heretofore been provided a cooking device which has sufficient capacity for large groups and which has sufficient versatility to handle meat of varying sizes. The present invention provides such a cooking device.

SUMMARY OF THE INVENTION

In accordance with the present invention there is provided a dual purpose barbecue grill and rotisserie cooking device in which foods may be cooked simultaneously to any desired degree. Furthermore, the device is portable and can be easily assembled and disassembled if desired. The cooking device comprises:

a. two upright end frame members each preferably having legs on the bottom thereof, and preferably at least one of the frame members has wheels rotatably mounted to the legs, b. an elongated handle member (preferably U-shaped) detachably mounted to the end frame members in such a manner that the frame members face each other but are separated along the handle member, c. side panels attached to the handle member between the end frame members, at least one of the side panels having means for permitting air flow therethrough, d. an elongated rotisserie bar extending between the end frame members and rotatably mounted to each end frame member, e. fuel tray means below said rotisserie bar, wherein the distance between said tray means and said rotisserie bar is controlled by first adjustable support means, f. grill means disposed between the fuel tray means and the rotisserie bar, wherein the distance between said tray means and said grill means is controlled by second adjustable support means, and g. power means for causing rotation of the rotisserie bar.

The novel cooking device is particularly suited for events supported by large groups such as social clubs, churches, lodges, resorts, country clubs, motels, hotels, etc. The novel cooking device also cooks foods quickly and efficiently and is easy to control.

Furthermore, the cooking device is portable and collapsible so that it can be easily moved, stored, assembled, etc.

DETAILED DESCRIPTION OF THE INVENTION

The invention is further described in more detail hereinafter with reference to the accompanying drawings wherein like reference characters refer to the same parts throughout the several views and in which:

FIG. 1 is a side view of one embodiment of the novel cooking device of the invention;

FIG. 2 is a cross-sectional view of the cooking device of FIG. 1; and

FIG. 3 is an exploded view of a coupler device used to connect the rotisserie bar to the drive means.

In FIGS. 1 and 2 there is shown one embodiment of cooking device 10 comprising two upright end frame members 12 each having legs 14 on the bottom thereof. In this embodiment both end frame members have wheels 16 rotatably mounted on the legs. Frame members 12 are generally made of metal for best structural integrity. The legs 14 are preferably integral with the frame members.

An elongated U-shaped handle member 18 extends the length of the cooking device and is detachably mounted to the end frame members 12 in such a manner that the frame members face each other but are separated along the arms of the handle. Although handle 18 is shown as an integral member it is not necessary for this to be so. Preferably the handle member 18 is a round metal rod or pipe in U-shape so that the end frame members may be simply slipped onto the handle member through appropriate holes in the frame members. The frame members 12 may be removably fastened to the handle member, if desired, by appropriate pins, bolts, or other fastening means.

Side panels 20 are attached to each arm of the U-shaped handle 18 between the end frame members. Preferably, both of the side panels 20 have means for permitting air flow therethrough. This is shown in this embodiment as louvers 22, although instead of louvers one may simply use holes through the side panels. The openings in the side panels permit air to flow therethrough which then becomes quickly heated. The heated air rises rapidly to the food above and causes it to cook faster. The result is that air is continually being heated and circulated upward to speed the cooking process.

Preferably, one or both of the side panels are hingably attached to the arms of the handle member. This may be accomplished, for example, as shown in the drawings wherein the top edge of the side panels are partially wrapped around the arms of handle member 18. The hingably attached side panels may be swung out and upward by means of handle 23 after turning clip means 21.

Rotisserie bar 24 is rotatably supported on the top portions of the frame members 12 by means of bushings or bearings 26. Prongs 28 on bar 24 serve to anchor the food to be cooked thereon. Preferably, rotisserie bar 24 is connected to drive means 30 by means of slidably engageable coupler device 32 (shown in more detail in FIG. 3). This coupler device permits easy disengagement of the rotisserie bar from the drive means and also assures proper rotation of the rotisserie bar even if it should be bowed under the weight of the food being cooked thereon.

Fuel tray means 34 is disposed below the rotisserie bar 24 and is preferably suspended by means of chain members 36 from the arms of handle member 18. The relative distance between the tray means 34 and rotisserie bar 24 may be varied by unhooking the chain members from catch means 38 and lowering or raising the tray to the desired level and then again hooking the chain member onto the catch means. Other conventional adjustable support means may be used in place of chain members 36 and catch means 38. Tray means 34 may also include means for catching and retaining grease dripping down from meat being cooked on grill means 40 and rotisserie bar 24. Fuel tray means 34 may comprise one tray or several trays.

Grill means 40 is disposed between fuel tray 34 and rotisserie bar 24 and is suspended by means of chain members 42 from the arms of handle member 18. The relative distance between grill means 40 and fuel tray 34 may also be varied by lowering or raising grill means 40 using chain members 42 in the same manner as chain members 36 are used. Grill means 40 is open so that radiant heat and heated air may pass through it to also reach food cooking on the rotisserie bar 24. Grill means 40 is preferably made of metal and may comprise one or more separate grills. Steaks or hamburgers, for example, may be cooked on grill means 40 while other larger pieces of meat are being simultaneously cooked on rotisserie bar 24.

Preferably hood member 44 at least partially houses rotisserie bar 24 to help keep heat from escaping. The hood is typically made of metal.

Power means 46 causes the rotation of the rotisserie bar and is preferably a variable speed electric motor, and power cord 47 is connected to a power source. Preferably power means 46 is connected to drive means 30 which may be, for example, a gear reduction box or similar device. It is also preferable for power means 46 and drive means 30 to be capable of turning the rotisserie bar both forwards and backwards.

The cooking device of the invention is very versatile in that it is capable of simultaneously cooking various types of food to any desired degree. The device is also very efficient since it is capable of cooking large pieces of meat at a faster rate than possible with conventional barbecue devices.

Other variations are possible within the scope of the present invention.

What is claimed is:

1. A dual purpose barbecue grill and rotisserie cooking device comprising:
   a. two upright end frame members,
   b. an elongated handle member detachably mounted to said end frame members in such a manner that said frame members face each other but are separated along said handle member,
   c. side panels attached to said handle member between said end frame members, at least one of said side panels having means for permitting air flow therethrough,
   d. an elongated rotisserie bar extending between said end frame members and rotatably mounted to each said end frame member,
   e. fuel tray means below said rotisserie bar, wherein the distance between said tray means and said rotisserie bar is controlled by first adjustable support means,
   f. grill means disposed between said fuel tray means and said rotisserie bar, wherein the distance between said tray means and said grill means is controlled by second adjustable support means, and
   g. power means for causing rotation of said rotisserie bar.

2. A cooking device in accordance with claim 1, further comprising a hood member at least partially housing said rotisserie bar.

3. A cooking device in accordance with claim 1, wherein said handle member is U-shaped and there is at least one side panel attached to each arm of said handle member.

4. A cooking device in accordance with claim 3, wherein at least one of said side panels is hingably attached to one of said arms of said U-shaped handle member.

5. A cooking device in accordance with claim 1, wherein said first adjustable support means comprises chain members connected at one end to said tray means and at the other end to first catch means.

6. A cooking device in accordance with claim 1, wherein said second adjustable support means comprises chain members connected at one end to said grill means and at the other end to second catch means.

7. A cooking device in accordance with claim 1, wherein said power means is operatively connected to a drive means which is in turn operatively connected to said rotisserie bar.

8. A cooking device in accordance with claim 7, wherein said drive means is connected to said rotisserie bar by means of a slidably engageable coupler device.

9. A cooking device in accordance with claim 1, wherein said power means comprises a variable-speed electric motor.

10. A cooking device in accordance with claim 1, wherein said side panel means for permitting air flow therethrough comprises louvers therein.

11. A cooking device in accordance with claim 1, wherein said upright end frame members each have legs on the bottom thereof and at least one of said frame members has wheels rotatably mounted to said legs.

* * * * *